United States Patent [19]

Kanazawa

[11] 4,397,540

[45] Aug. 9, 1983

[54] COPYING MACHINE FOR MICROFILM

[75] Inventor: Yukio Kanazawa, Kanagawa, Japan

[73] Assignee: Fuji Xerox Co., Ltd., Tokyo, Japan

[21] Appl. No.: 337,912

[22] Filed: Jan. 8, 1982

[30] Foreign Application Priority Data

Jan. 20, 1981 [JP] Japan .................................. 56-6720

[51] Int. Cl.³ ...................... G03G 15/00; G03G 15/04
[52] U.S. Cl. ................. 355/14 R; 355/14 C; 355/55
[58] Field of Search ............ 355/55, 56, 14 C, 14 R, 355/44, 52, 3 R; 354/25, 195; 353/101, 68, 69

[56] References Cited

U.S. PATENT DOCUMENTS

| | | | |
|---|---|---|---|
| 3,662,662 | 5/1972 | Dewan | 355/55 X |
| 3,691,922 | 9/1972 | König et al. | 355/55 X |
| 4,018,520 | 4/1977 | Aste | 353/101 |
| 4,238,157 | 12/1980 | Strauch et al. | 355/55 X |
| 4,268,165 | 5/1981 | Bradmon | 354/25 X |
| 4,351,606 | 9/1982 | Franko | 355/14 R |
| 4,360,264 | 11/1982 | Baker et al. | 355/55 X |

Primary Examiner—A. C. Prescott
Attorney, Agent, or Firm—Sughrue, Mion, Zinn, Macpeak & Seas

[57] ABSTRACT

A copying machine has an optical mechanism which varies a back focal length of a lens. A control circuit generates a control signal so that the optical mechanism changes the back focusing length of the lens so the lens is first focused on an upper surface of a microfilm and then on a lower surface of the microfilm. An optical sensor generates separate light quantity signals for each focusing position of the lens and these signals are held and compared in a circuit which then determines which surface of the microfilm bears a picture. The optical mechanism then appropriately adjusts the back focal length of lens.

6 Claims, 2 Drawing Figures

COPYING MACHINE FOR MICROFILM

BACKGROUND OF THE INVENTION

1. Field of the Invention

This invention relates to a copying machine for microfilm.

2. Description of the Prior Art

In a conventional copying machine for microfilm, the image of a picture formed on a microfilm is enlarged by a lens and the image thus enlarged is projected onto a photo-sensitive material through a slit member at an image focusing point thereof. A typical example of such a conventional copying machine for microfilm has been disclosed by the specification of Japanese Patent Application Publication No. 396/1965.

A picture is formed only on one surface of a microfilm. Therefore, when the microfilm is set on the copying machine so that the lens is correctly focused on that surface, the conventional copying machine operates satisfactorily. However, when the microfilm is turned over and set on the copying machine, the lens cannot be correctly focused on the picture. In order to force the lens to focus on the picture in this case, sometimes a manual focusing operation is employed. However, manual focusing is considerably delicate and difficult.

SUMMARY OF THE INVENTION

Accordingly, an object of the present invention is to provide a copying machine for microfilm wherein an image of a picture on a surface of a microfilm can be reproduced under optimum focusing conditions regardless of which surface of the microfilm has the picture thereon.

A copying machine according to the invention is provided with an optical mechanism which varies the back focal length of a lens with the aid of external signals so that the lens is optimumly focused on both surfaces of a microfilm. One example of the optical mechanism which can be used is a turret type lens system disclosed by Japanese Patent Application Publication No. 396/1965. In the turret type lens system, a plurality of lens devices are provided on a turret so that when one lens device is placed in the optical path, the image of one surfaces of a microfilm, for instance the upper surface, is projected onto a photosensitive material (not shown) under optimum focusing conditions. On the other hand when the other lens device is placed in the optical path the image of the opposite surface, in this case the lower surface, is projected onto the photo-sensitive material under optimum focusing conditions. The lens devices are selectively positioned by external signals. The optical mechanism may be one which is adapted to change the position of a mirror or one adapted to change the position of a lens.

The copying machine of the invention is further provided with a control circuit for controlling the optical mechanism. The control circuit provides signals for setting the back focal length of the lens to a predetermined value by the optical mechanism.

DESCRIPTION OF THE PREFERRED EMBODIMENTS

Figure 1:
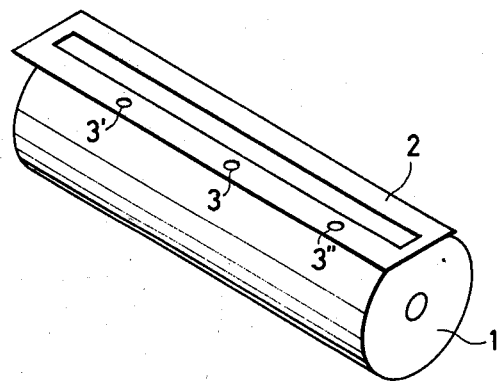
FIG. 1 is a perspective view showing mounting positions of optical sensors employed in the present invention.

As shown in FIG. 1, a slit member 2 is provided at the same position as an image forming point of a photosensitive drum. A single or a plurality of sensors 3, 3' and 3" are provided on the slit member 2. in the case where only one sensor is provided on the slit member 2, it is desirable that the sensor be positioned at the center portion of the slit member 2. These sensors are so designed that they can adjust the focusing position independently of one another, i.e. they can adjust the focusing position with respect to the photo-sensitive drum.

Figure 2:
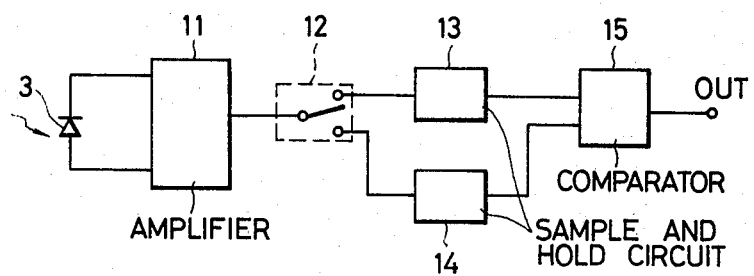
FIG. 2 is a circuit diagram showing a decision circuit used in the invention.

A copying machine for microfilm according to the invention is provided with a decision circuit as shown in FIG. 2. The decision circuit decides whether a microfilm has its picture on the upper surface or the lower surface and a signal is applied to the aforementioned control circuit based upon the decision result of the decision circuit. This signal results in a selection instruction being applied to the optical mechanism which sets the back focal length of the lens to a predetermined value.

The decision circuit comprises an amplifier 11 for amplifying a light quantity signal from an optical sensor 3, two sample and hold circuits 13 and 14 connected through a switch 12 to the amplifier 11, and a comparator 15 to which the outputs of the sample and hold circuits 13 and 14 are applied for comparison.

The decision circuit thus organized operates as follows:

First, the back focal length of the lens is selected by the optical mechanism so that the lens is optimumly focused on the upper surface of the microfilm to project the image. In this operation, a light quantity signal outputted by the optical sensor 3 (3', 3", ... ) is held by the sample and hold circuit 13. Then, the optical mechanism is so controlled that the lens is optimumly focused on the lower surface of the microfilm to project the image and another light quantity output signal is generated by the sensor and this is held by the sample and hold circuit 14 by operating the switch 12. The hold output signals of the circuits 13 and 14 are applied to the comparator 15. The output signal OUT of the comparator 15 represents a decision result as a logic level. More specifically, in the case where the picture is on the upper surface of the microfilm, the output signal OUT is at a high logic level and in the case where the picture is on the lower surface of the microfilm the output signal OUT is at a low logic level. The output signal OUT is applied to the aforementioned control circuit so that the optical mechanism sets a back focal length suitable for the microfilm used.

According to the invention, no matter what surface of a microfilm has a picture, the picture can be automatically reproduced under optimum focusing conditions. It is obvious that the optimum focusing detecting mechanism according to the invention is applicable to a microfilm reader also.

I claim:

1. A copying machine, for a microfilm, having an optical system in which an image of a picture on said microfilm is enlarged and projected onto a photosensitive material through a slit member at an image forming point by a lens, comprising;

an optical mechanism for varying a back focal length of said lens in response to a control signal;

control means for generating said control signal so that said optical mechanism varies said focal length so that said lens is first focused on an upper surface and then on a lower surface of said microfilm;

at least one optical sensor located on said slit member for generating a separate light quantity output signal when said lens is focused on said upper and said lower microfilm surfaces respectively;

means for holding said separate light quantity output signals;

means for comparing said separate light quantity output signals to determine the surface of said microfilm which bears said picture, said comparison means being connected to said control means so that said control means generates an additional control signal so that said optical mechanism sets said back focal length in accordance with the surface of the microfilm bearing said picture.

2. The copying machine claimed in claim 1 wherein one of said at least one optical sensor is located at a center section of said slit member.

3. The copying machine claimed in claim 2 wherein said optical system is adapted to change a position of said lens.

4. The copying machine claimed in claim 2 wherein said optical mechanism is adapted to change a position of a mirror.

5. The copying machine claimed in claim 3 or 4 wherein a plurality of optical sensors are located on said slit member.

6. The copying machine claimed in claim 5 further comprising an amplifier for amplifing said light quantity output signals generated by said optical sensors.

* * * * *